United States Patent Office 3,015,673
Patented Jan. 2, 1962

3,015,673
NEW UREA DERIVATIVES AND PREPARATION THEREOF
Peter Hans Zahler, Berne, Switzerland, assignor to Swiss Serum and Vaccine Institute, Berne, Switzerland
No Drawing. Filed Sept. 25, 1957, Ser. No. 686,045
Claims priority, application Switzerland Sept. 28, 1956
1 Claim. (Cl. 260—553)

This invention relates to new urea derivatives which are antidiabetic drugs for oral administration, and to the preparation of these compounds.

In particular the compounds of my invention are N(3-aminophenylsulfonyl)-N-alkyl-ureas of the general formula

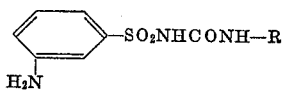

wherein R is an alkyl radical containing 3 to 6 carbon atoms.

These new compounds reduce, after oral administration, the blood sugar level and, therefore, they should be used chiefly as antidiabetic drugs.

Arylsulfonylureas have already repeatedly been prepared and pharmacologically tested.

It concerns compounds substituted in the 4-position in the benzene nucleus; up till now only these compounds have been of interest. Fuchs et al., Achelis et al. and Bertram et al. report in the "Deutsche Medizinische Wochenschrift" 1955, No. 40, pp. 1449–1460 on the hypoglycemic effect of N(4-aminobenzenesulfonyl)-N'-n-butyl-urea and its use as peroral antidiabetic drug. It is understandable that the interest in this compound is very keen. However it cannot be overlooked that the requirements demanded by the practice are very high. Even after years of regular administration no after effects should be apparent. As, however, the compound mentioned has, in addition, a bactericidal action, in time undesired secondary effects do appear, especially a change in the intestinal flora.

Now, it has surprisingly been found that N(3-aminobenzenesulfonyl)-N'-alkyl-ureas reduce the blood sugar level without having a bactericidal action. The hypoglycemic effect of N(3-aminobenzene-sulfonyl)-N'-n-butyl-urea, for example, is comparable to those of N(4-aminobenzene-sulfonyl)-N'-n-butyl-urta, but the antibacterial action is lacking.

The antibacterial action of N(3-aminobenzenesulfonyl)-N'-n-butyl-urea was tested on 50 bacterial strains, comprising among others Staphylococcus, Streptococcus, Enterococcus, *Pseudomonas aeruginosa*, Monilia, Yeasts, Salmonella, *Hemophilus influenza, Hemophilus pertussis, Escherichia coli, Klebsiella pneumoniae*. No bactericidal or bacteriostatic action could be determined. Comparative experiments showed that after administration of N(4-aminobenzene-sulfonyl)-N'-n-butyl-urea to mice (fed sterile and kept isolated) the Coli flora in the stools of the animals disappeared already after 24 hours. With N(3-aminobenzenesulfonyl)-N'-n-butyl-urea, on the other hand, no change of the intestinal flora could be detected. From this results that with N(3-aminobenzene-sulfonyl)-N'-n-butyl-urea, contrary to N(4-aminobenzene-sulfonyl)-N'-n-butyl-urea, even after a long and regular administration, no action on the vital intestinal flora is to be expected. As antidiabetic drugs must be administered regularly over a long period, this result is of great significance.

The compounds of my invention are prepared preferably by interaction of an alkalimetal salt of 3-nitro-phenyl-sulfonamide or of a 3-acylaminophenyl-sulfonamide with an alkylisocyanate or an alkylcarbaminic acid chloride, and subsequent reduction of the nitro group or hydrolysis of the acylamino group in the primary reaction products which are N(3-nitro- or 3-acylaminophenyl)-N'-alkyl ureas.

The following examples are presented in order to illustrate the invention in further details. The details set forth are in no way to be construed as limiting the invention in spirit or in scope.

Example 1

15.15 gm. (0.075 mol) of 3-nitrobenzene-sulfonamide are dissolved in 37.5 cc. of 2.0 n solution of caustic soda. To the solution are added about 40 cc. of acetone. Then the solution is cooled to 0° C. and in the course of 1 to 3 hours 8.5 g. of n-butylisocyanate (obtained by reaction of n-butylaminehydrochloride with phosgene in o-dichlorobenzene at about 100° C. and fractional distillation; boiling point: 115° C.), are added drop-wise. The reaction solution is stirred for some hours. After evaporation of the acetone and clearing of the remaining aqueous solution by filtration, the reaction product is obtained after addition of an acid by fractional precipitation (suitably by electrometric pH-control). At pH of 8.0 to 8.5 0.7 g. of unchanged 3-nitrobenzenesulfonamide is precipitated. On stronger acidifying (at pH 4.5) 20.7 g. (91.5%) of pure N(3-nitrobenzenesulfonyl)-N'-n-butyl-urea are precipitated (melting point 166–167° C.).

Microanalysis calculated for $C_{11}H_{15}O_5N_3S$ (301.31):

C calculated, 43.85%; found, 43.93%
H calculated, 5.02%; found, 4.91%
N calculated, 13.95%; found, 13.86%

N(3-nitrobenzenesulfonyl)-N'-n-butyl-urea can be recrystallized from much water, from ethanol, isopropanol, acetic acid, chloroform or a little acetic ester. It is readily soluble in sodium-hydrogen-carbonate solution, but scarcely soluble in water and aqueous acids.

Example 2

14 g. of N(3-nitrobenzenesulfonyl)-N'-n-butyl-urea (0.0465 mol) are suspended in 150 cc. of acetic acid ethyl ester together with 3 g. of palladium carbon catalyst (5% palladium) and treated (hydrogenized) with hydrogen at normal pressure. The absorption of hydrogen is very active. The reaction solution becomes warm. After about 10–20 minutes the absorption of hydrogen is already complete. The catalyst is filtered off by suction and washed with acetic ester. The filtrate is carefully evaporated to dryness and the residue—N(3-aminobenzenesulfonyl)-N'-n-butyl-urea—is recrystallized from a mixture of 20 cc. of ethanol and 20 cc. of water. Melting point: 108–109° C. Yield: 10.25 g., i.e. 81.5% of the theoretical.

Microanalysis calculated for $C_{11}H_{17}O_3N_3S$ (271.27):

C calculated, 48.70%; found, 48.61%
H calculated, 6.32%; found, 6.48%
N calculated, 15.49%; found, 15.51%

From the mother liquor a further small amount of the compound is obtained by concentration and repeated recrystallization. The new compound is hardly soluble in water, but readily soluble in aqueous solutions of alkali, alkali carbonates and alkalihydrogencarbonates. N(3-nitrobenzenesulfonyl)-N'-n-butyl-urea can be reduced in form of its alkali salt also in aqueous solution to N(3-aminobenzenesulfonyl)-N'-n-butyl-urea. Thereby attention must be paid to the pH value of the reaction solution, which must be kept as low as possible, as otherwise side reactions occur.

I claim:
N(3-aminobenzenesulfonyl)-N'-n-butyl-urea.

References Cited in the file of this patent

UNITED STATES PATENTS 2,371,178  Martin ---------------- Mar. 13, 1945

FOREIGN PATENTS 162,955  Austria _ -------------- Apr. 25, 1949
71,236   Norway ---------------- Nov. 4, 1946
220,971  Switzerland ------------ Aug. 1, 1942
233,109  Switzerland ------------ Oct. 2, 1944

OTHER REFERENCES

Ellis: Hydrogenation of Organic Substances (D. Van Nostrand Co., New York, 3rd ed., 1930), page 262.

Backer et al: Rec. trav. Chim., vol 69, pages 1330–1331 (1950).

Achelis: Deutsche Medizin. Wochenschrift, vol. 80, pages 1452–1455 (Oct. 7, 1955).

Maaske: Deutsche Medizin. Wochenschrift, vol. 81, pages 823–825 (May 25, 1956).